United States Patent
Gu et al.

(10) Patent No.: US 12,472,222 B2
(45) Date of Patent: Nov. 18, 2025

(54) TRADITIONAL CHINESE MEDICINE COMPOUND PREPARATION FOR TREATING PARKINSON'S DISEASE AND ITS PREPARATION METHOD AND APPLICATION

(71) Applicant: NANTONG UNIVERSITY, Jiangsu (CN)

(72) Inventors: Xiaosong Gu, Jiangsu (CN); Chunkang Tang, Jiangsu (CN); Leilei Gong, Jiangsu (CN); Xiaomin Wang, Jiangsu (CN); Xin Tang, Jiangsu (CN)

(73) Assignee: NANTONG UNIVERSITY (CN)

( * ) Notice: Subject to any disclaimer, the term of this patent is extended or adjusted under 35 U.S.C. 154(b) by 375 days.

(21) Appl. No.: 17/996,076

(22) PCT Filed: Aug. 5, 2020

(86) PCT No.: PCT/CN2020/106957
§ 371 (c)(1),
(2) Date: Oct. 12, 2022

(87) PCT Pub. No.: WO2022/007081
PCT Pub. Date: Jan. 13, 2022

(65) Prior Publication Data
US 2023/0210936 A1  Jul. 6, 2023

(30) Foreign Application Priority Data
Jul. 10, 2020 (CN) .......................... 202010661407.4

(51) Int. Cl.
| | | |
|---|---|---|
| A61K 36/8988 | (2006.01) |
| A61K 35/583 | (2015.01) |
| A61K 36/232 | (2006.01) |
| A61K 36/284 | (2006.01) |
| A61K 36/286 | (2006.01) |
| A61K 36/36 | (2006.01) |
| A61K 36/481 | (2006.01) |
| A61K 36/515 | (2006.01) |
| A61K 36/52 | (2006.01) |
| A61K 36/64 | (2006.01) |
| A61K 36/725 | (2006.01) |
| A61K 36/74 | (2006.01) |
| A61K 36/815 | (2006.01) |
| A61P 25/16 | (2006.01) |

(52) U.S. Cl.
CPC ........ *A61K 36/8988* (2013.01); *A61K 35/583* (2013.01); *A61K 36/232* (2013.01); *A61K 36/284* (2013.01); *A61K 36/286* (2013.01); *A61K 36/36* (2013.01); *A61K 36/481* (2013.01); *A61K 36/515* (2013.01); *A61K 36/52* (2013.01); *A61K 36/64* (2013.01); *A61K 36/725* (2013.01); *A61K 36/74* (2013.01); *A61K 36/815* (2013.01); *A61P 25/16* (2018.01); *A61K 2236/331* (2013.01); *A61K 2236/37* (2013.01); *A61K 2236/51* (2013.01)

(58) Field of Classification Search
None
See application file for complete search history.

(56) References Cited

PUBLICATIONS

English translations of CN 101269188—2008.*
English translation of CN 104721687—2015.*
Liang (Acta Pharmaceutica Sinica B (2013), vol. 1, No. 1, pp. 55-64).*

* cited by examiner

*Primary Examiner* — Susan Hoffman

(57) ABSTRACT

A traditional Chinese medicine compound preparation for treating Parkinson's disease and its preparation method and application are disclosed. The traditional Chinese medicine compound preparation comprises traditional Chinese medicine formula components and the traditional Chinese medicine formula components comprise the following raw material or raw material extracts by mass: 6-15 parts of *uncaria rhynchophylla*, 3-9 parts of *gastrodia elata*, 6-12 parts of *Gentiana macrophylla*, 10-20 parts of raw *Astragalus membranaceus*, 10-20 parts of prepared *rehmannia* roots, 10-20 parts of *achyranthes* roots, 10-20 parts of wolfberry fruits, 10-20 parts of *angelica sinensis*, 10-20 parts of fried *atractylodes macrocephala*, 6-15 parts of fried spina date seeds, 3-12 parts of walnut kernels, 3-9 parts of safflower, and 20-30 parts of *zaocys dhumnade*.

12 Claims, No Drawings

TRADITIONAL CHINESE MEDICINE COMPOUND PREPARATION FOR TREATING PARKINSON'S DISEASE AND ITS PREPARATION METHOD AND APPLICATION

FIELD

The present invention, relates to a traditional Chinese medicine compound preparation for treating Parkinson's disease and its preparation method and application, and belongs to the technical field of biomedicine.

BACKGROUND

Parkinson's disease (PD) is a chronic disease of the nervous system characterized by degeneration of dopaminergic neurons in the substantia nigra of the midbrain and clinical symptoms of movement disorders and non-motor symptoms, which seriously affects the life quality of patients. With the growing problem of aging in China, the incidence of Parkinson's disease continues to rise, causing a heavy burden on patients, families and society. Therefore, the development of traditional Chinese medicine preparations for Parkinson's disease is a major demand in today's society, as well as a major demand for people's livelihood and health. Levodopa is a routine medicine for treating Parkinson's disease, but long-term use of this medicine can cause diminishing efficacy and many complications. Therefore, the exploration and development of traditional Chinese medicine for treating Parkinson's disease is the current focus and hotspot in traditional Chinese medicine and clinical medicine, and the social needs are urgent.

SUMMARY

The technical problem to be solved by the present invention is to overcome the defects of the prior art, and to provide a traditional Chinese medicine compound preparation for treating Parkinson's disease and its preparation method and application. Based on the syndrome differentiation and treatment of deficiency in origin and excess in superficiality provided by combining occurrence and development of multi-level and multi-target Parkinson's disease and the overall functional condition of a patient, the prescription not only has the theoretical basis of modern science, but also achieves a good clinical effect, and obviously improves the life quality of patients.

In order to solve the above-mentioned technical problems, the present invention provides a traditional Chinese medicine compound preparation for treating Parkinson's disease, comprising traditional Chinese medicine formula components, wherein the traditional Chinese medicine formula components comprises the following raw material or raw material extracts by mass: 6-15 parts of *uncaria rhynchophylla*, 3-9 parts of *gastrodia elata*, 6-12 parts of *Gentiana macrophylla*, 10-20 parts of raw *Astragalus membranaceus*, 10-20 parts of prepared *rehmannia* roots 10-20 parts of *achyranthes* roots, 10-20 parts of wolfberry fruits, 10-20 parts of *angelica sinensis*, 10-20 parts of fried *atractylodes macrocephala*, 6-15 parts of fried spina date seeds, 3-12 parts of walnut kernels, 3-9 parts of safflower, and 20-30 parts of *zaocys dhumnade*.

Preferably, the traditional Chinese medicine formula components comprise the following components, by mass: 12 parts of *uncaria rhynchophylla*, 6 parts of *gastrodia elata*, 6 parts of *Gentiana macrophylla*, 10 parts of raw *Astragalus membranaceus*, 15 parts of prepared *rehmannia* roots, 10 parts of *achyranthes* roots, 10 parts of wolfberry fruits, 10 parts of *angelica sinensis*, 10 parts of fried *atractylodes macrocephala*, 6 parts of fried spina date seeds, 3 parts of walnut kernels, 3 parts of safflower, and 20 parts of *zaocys dhumnade*.

Preferably, the traditional Chinese medicine formula components comprise the following components, by mass: 6 parts of *uncaria rhynchophylla*, 9 parts of *gastrodia elata*, 10 parts of *Gentiana macrophylla*, 15 parts of raw *Astragalus membranaceus*, 20 parts of prepared *rehmannia* roots, 20 parts of *achyranthes* roots, 15 parts of wolfberry fruits, 20 parts of *angelica sinensis*, 15 parts of fried *atractylodes macrocephala*, 15 parts of fried spina date seeds, 12 parts of walnut kernels, 9 parts of safflower, and 25 parts of *zaocys dhumnade*.

Preferably, the traditional Chinese medicine formula components comprise the following components by mass: 15 parts of *uncaria rhynchophylla*, 3 parts of *gastrodia elata*, 12 parts of *Gentiana macrophylla*, 20 parts of raw *Astragalus membranaceus*, 10 parts of prepared *rehmannia* roots. 16 parts of *achyranthes* roots, 20 parts of wolfberry fruits, 15 parts of *angelica sinensis*, 20 parts of fried *atractylodes macrocephala*, 10 parts of fried spina date seeds, 10 parts of walnut kernels, 7 parts of safflower, and 30 parts of *zaocys dhumnade*.

Preferably, the compound preparation of the present invention comprises effective doses of the traditional Chinese medicine formula components and pharmaceutically acceptable adjuvants.

Preferably, a dosage form of the traditional Chinese medicine compound preparation for treating Parkinson's disease is one of oral liquid, granules, instant soluble granules and tablets.

The present invention further provides a preparation method of a traditional Chinese medicine compound preparation in a dosage form of oral liquid for treating Parkinson's disease, comprising:

(1) preparing raw materials according to a formula ratio: 12 parts of *uncaria rhynchophylla*, 6 parts of *gastrodia elata*, 6 parts of *Gentiana macrophylla*, 10 parts of raw *Astragalus membranaceus*, 15 parts of prepared *rehmannia* roots, 10 parts of *achyranthes* roots, 10 parts of wolfberry fruits, 10 parts of *angelica sinensis*, 10 parts of fried *atractylodes macrocephala*, 6 parts of fried spina date seeds, 3 parts of walnut kernels, 3 parts of safflower, and 20 parts of *zaocys dhumnade*; and rinsing the medicinal materials with water to remove impurities;

(2) soaking with deionized water at 25° C. for 120 min;

(3) carrying out water extraction and then performing decoction at 100° C. for 20 min;

(4) taking decoction liquid, setting the decoction liquid still at 4° C. for 12 h, then carrying out filtering and concentration, and then adding benzoic acid or sodium benzoate; and (5) carrying out potting and sterilization, thus obtaining the oral liquid.

The present invention further provides a preparation method of a traditional Chinese medicine compound preparation in a dosage form of granules for treating Parkinson's disease, comprising:

(1) preparing raw materials according to a formula ratio: 12 parts of *uncaria rhynchophylla* 6 parts of *gastrodia elata*, 6 parts of *Gentiana macrophylla*, 10 parts of raw *Astragalus membranaceus*, 15 parts of prepared *rehmannia* roots, 10 parts of *achyranthes* roots, 10 parts of wolfberry fruits, 10 parts of *angelica sinensis,* 10 parts of fried *atractylodes macrocephala,* 6 parts of fried spina date seeds, 3 parts of walnut kernels, 3 parts of safflower, and 20 parts of *zaocys dhumnade*; and rinsing the medicinal materials with water to remove impurities;

(2) soaking with deionized water at 25° C. for 120 min;

(3) carrying out water extraction and then performing decoction at 100° C. for 20 min;

(4) taking decoction liquid, setting the decoction liquid still at 4° C. for 12 h, then carrying out filtering and concentration, and then adding benzoic acid or sodium benzoate; and (5) carrying out drying, granulating, packaging and sterilization, thus obtaining the granules.

The present invention, further provides an application of the Chinese medicine compound preparation for treating Parkinson's disease in preparation of a medicine for preventing and/or treating Parkinson's disease.

This formula adopts *uncaria rhynchophylla, gastrodia elata* and *Gentiana macrophylla* as: monarch medicinal materials; raw *Astragalus membranaceus*, prepared *rehmannia* roots, *achyranthes* roots, wolfberry fruits, and fried spina date seeds as ministerial medicinal materials; *angelica sinensis*, fried *atractylodes macrocephala*, walnut kernels, and safflower as adjuvant medicinal materials; and *zaocys dhumnade* as a conductant medicinal material.

This formula takes effects of nourishing deficiency, benefiting the brain, nourishing blood and liver and kidneys, quenching wind and calming the mind; and nourishing nerves, improving, muscle stiffness and tremor. This formula is applicable to early and mid-stage symptoms of Parkinson's disease: anorexia, insomnia, constipation, smell degeneration, decreased concentration, slow movement, muscle stiffness and tremor.

Beneficial effects achieved by the present invention:

1. The composition of this formula is novel, and it is a unique medicine formula, composition formed on the basis of traditional medicinal materials and focusing on the modern pathological mechanism of Parkinson's disease.

2. The innovation of the efficacy of this formula lies in the dialectical treatment of Parkinson's motor symptoms and non-motor symptoms. For example, for motor symptoms such as bradykinesia, tremor, and muscle rigidity, *uncaria rhynchophylla, gastrodia elata* and *Gentiana macrophylla* are used in this formula to quench wind, stop spasm, eliminate stiffness and defibrillate; for non-motor symptoms, such as daily activities, insomnia, vivid dreams, constipation, emotional health and other obstacles, this formula adopts prepared *rehmannia* roots, *achyranthes* roots, *Astragalus membranaceus* and wolfberry fruits to nourish yin and blood, nourishes liver and kidneys, and improve non-motor symptoms.

3. This formula based on the theory of dialectical treatment of Parkinson's disease is unique and novel and its innovation focuses on the etiology of the disease. Parkinson's disease is a degeneration of the nervous system. Traditional Chinese medicine believes that this disease is caused by deficiency of both liver and kidneys, with less qi and blood. The kidneys store the essence, also known as true yin. The kidneys promote the growth of bone and marrow and nourish the brain, and the liver controls the storage of blood. Tremor paralysis is caused by the internal movement of liver wind "Deficiency in origin and excess in superficiality" means the deficiency in qi and blood of liver and kidneys and excess in wind, fire, phlegm and blood stasis. Tonifying the liver and nourishing the kidneys can fundamentally improve the occurrence and development of Parkinson's disease. On the basis of tonifying the liver and nourishing the kidneys, the function of eliminating stiffness and defibrillation can be achieved in combination with anti-wind and antispasmodic medicines.

4. This formula also innovatively uses *Astragalus membranaceus* for tonifying qi and blood, *angelica sinensis* and safflower for nourishing blood and dredging collaterals, and walnut kernel for promoting blood circulation. The four medicinal materials work together and supplement to each other in effect to achieve strong qi and blood, smoothen veins, nourish the heart and spleen, and ameliorate general symptoms of the patients. Constipation is also a common clinical symptom of Parkinson's disease. This formula adopts spina date seeds and walnut kernels to achieve a laxative effect.

The innovations of the four aspects are integrated to exert synergistic effects. Therefore, based on the dialectical treatment of deficiency in origin and excess in superficiality provided by combining occurrence and development of multi-level and multi-target Parkinson's disease and the overall functional condition of a patient, the prescription not only has the theoretical basis of modern science, but also achieves a good clinical effect, and obviously improves the life quality of the patients.

DETAILED DESCRIPTION

The present invention will be further described below in conjunction with embodiments. The following examples are only used to illustrate the technical solutions of the present invention more clearly, and cannot be used to limit the scope of the present invention.

Example 1: Preparation of Traditional Chinese Medicine Compound Oral Liquid for Treating Parkinson's Disease According to the formula, the raw materials include, by weight, 12 parts of *uncaria rhynchophylla,* 6 parts of *gastrodia elata,* 6 parts of *Gentiana macrophylla,* 10 parts of raw *Astragalus membranaceus,* 15 parts of prepared *rehmannia* roots, 10 parts of *achyranthes* roots, 10 parts of wolfberry fruits, 6 parts of fried spina date, seeds, 10 parts of *angelica sinensis,* 10 parts of fried *atractylodes macrocephala,* 3 parts of walnut kernels, 3 parts of safflower, and 20 parts of *zaocys dhumnade.*

Preparation Method and Steps (1) rinsing the medicinal materials with water to remove impurities;

(2) soaking with deionized water at 25° C. for 120 min;

(3) carrying out water extraction and then performing decoction at 100° C. for 20 min;

(4) taking decoction liquid, setting the decoction liquid still at 4° C. for 12 h (under a sterile condition), then carrying out filtering and concentration, and then adding benzoic acid or sodium benzoate; and (5) carrying out potting and sterilization, thus obtaining the oral liquid.

Example 2: Preparation of Traditional Chinese Medicine Compound Oral Liquid for Treating Parkinson's Disease According to the formula, the raw materials include, by weight, 6 parts of *uncaria rhynchophylla*, 9 parts of *gastrodia elata*, 10 parts of *Gentiana macrophylla*, 15 parts of raw *Astragalus membranaceus*, 20 parts of prepared *rehmannia* roots, 20 parts of *achyranthes* roots, 15 parts of wolfberry fruits, 20 parts of *angelica sinensis*, 15 parts of fried *atractylodes macrocephala*, 15 parts of fried spina date seeds, 12 parts of walnut kernels, 9 parts of safflower, and 25 parts of *zaocys dhumnade*.

The preparation method in this example is the same as in Example 1.

Example 3: Preparation of Traditional Chinese Medicine Compound Granules for Treating Parkinson's Disease According to the formula, the raw materials include, by weight, 12 parts of *uncaria rhynchophylla*, 6 parts of *gastrodia elata*, 6 parts of *Gentiana macrophylla*, 10 parts of raw *Astragalus membranaceus*, 15 parts of prepared *rehmannia* roots, 10 parts of *achyranthes* roots, 10 parts of wolfberry fruits, 6 parts of fried spina date seeds, 10 parts of *angelica sinensis*, 10 parts of fried *atractylodes macrocephala*, 3 parts of walnut kernels, 3 parts of safflower, and 20 parts of *zaocys dhumnade*.

Preparation Method and Steps
(1) rinsing the medicinal materials with water to remove impurities;
(2) soaking with deionized water at 25° C. for 120 min;
(3) carrying out water extraction and then performing decoction at 100° C. for 20 min;
(4) taking decoction liquid, setting the decoction liquid still at 4° C. for 12 h (under a sterile condition), then carrying out filtering and concentration, and then adding benzoic acid or sodium benzoate; and
(5) carrying out drying, granulating, packaging and sterilization, thus obtaining the granules.

Example 4: Preparation of Traditional Chinese Medicine Compound Granules for Treating Parkinson's Disease According to the formula, the raw materials include, by weight, 15 parts of *uncaria rhynchophylla*, 3 parts, of *gastrodia elata*, 12 parts of *Gentiana macrophylla*, 20 parts of raw *Astragalus membranaceus*, 10 parts of prepared *rehmannia* roots, 16 parts of *achyranthes* roots, 20 parts of wolfberry fruits 15 parts of *angelica sinensis*, 20 parts of fried *atractylodes macrocephala*, 10 parts of fried spina date seeds, 10 parts of walnut kernels, 7 parts of safflower, and 30 parts of *zaocys dhumnade*.

The preparation method in this example is the same as in Example 3.

Example 5: Treatment Effect of a Traditional Chinese Medicine Compound Oral Liquid for Treating Parkinson's Disease on Parkinson's Disease Model Mice Materials: Stock solution of a traditional Chinese medicine compound oral liquid for treating Parkinson's disease (5.4 g/kg)

Modeling drug MPTP (20 mg/kg); Madopa (3.75 g/kg); SPF C57BL/6 mice.

Method: 80 mice were randomly divided into negative group, model group, Madopar group, and traditional Chinese medicine group (the traditional Chinese medicine compound oral liquid prepared in Example 1), with 20 mice in each group. The mice were reared for 5 days to adapt to the environment, during which the mice were trained 3 times in behavioral studies. Modeling and administration, behavioral testing, rotarod test, open field test, morphological test, high performance liquid chromatography test, and statistical analysis were conducted.

Results: The results of the rotarod test showed that the model group, Madopar group and traditional Chinese medicine group has significantly reduced rotarod time (P<0.01) after modeling as compared with the negative group. After 1 week and 2 weeks of administration, compared with the negative group, the model group still had significantly reduced rotarod time (P<0.01), and the Medopa group and the traditional Chinese medicine group had significantly increased rotarod time as compared with the model group during the same period (P<0.01). The results of the open field test showed that the model group, the Madopar group and the traditional Chinese medicine group had significantly reduced movement distance (P<0.01) and significantly increased resting time (P<0.01) after modeling as compared with the negative group. After 1 week and 2 weeks of administration, compared with the negative group during the same period, the model group still had significantly reduced movement distance (P<0.01) and significantly increased resting time (P<0.01, P<0.05), and the Medopa group and the traditional Chinese medicine group had significantly increased movement distance (P<0.01, P<0.05) and significantly reduced resting time (P<0.01) as compared with the model group during the same period.

Morphological detection and immunohistochemical staining results showed that the number of substantia nigra neurons in the traditional Chinese medicine group was significantly greater than that in the model group and Madopar group after 1 week of administration (P<0.01). After 2 weeks of administration, the number of substantia nigra neurons in the Chinese medicine group was significantly increased compared with those in the model group and the Madopa group (P<0.01, P<0.05).

The results show that the traditional Chinese medicine compound oral liquid for treating Parkinson's disease has obvious protective effect on MPTP Parkinson's disease model mice, can improve the behavior of Parkinson's disease model mice, and can also increase the number of substantia nigra neurons in Parkinson's disease model mice, indicating that the traditional Chinese medicine has a good application, prospect.

Example 6: Study on the Application of a Traditional Chinese Medicine Compound Oral Liquid for Treating Parkinson's Disease in Improving Clinical Symptoms of Parkinson's Disease Patients Method: Three typical elderly Parkinson's cases (75-90 years old; disease course of 4-10 years, maintained by long-term use of dopasehydrazine, YAHR grade 4-5) were selected. The patients taken the traditional Chinese medicine compound oral liquid for treating Parkinson's disease (the administration of 28 days was a course of treatment, and the second course of treatment was carried out at an interval of 2-4 weeks, and the course of treatment was repeated for 2-5 courses). The amelioration of clinical symptoms of patients and the reduction of dopasehydrazine were observed.

Results: after 2-5 courses of treatment with the traditional Chinese medicine compound oral liquid, the clinical symptoms of 3 patients were ameliorated to Varying degrees, dopasehydrazine was reduced by 20% to 50%, and the YAHR was up to grade 2 to 4.

The results show that the traditional Chinese medicine compound oral liquid for treating Parkinson's disease has a good clinical effect on Parkinson's patients, and the clinical effect suggests that the traditional Chinese medicine compound oral liquid can regulate the multi-targets of human Parkinson's disease and repair degenerate nerves.

The above are only the preferred embodiments of the present invention. It should be pointed out that for those skilled in the art, several improvements and modifications can also be made without departing from the technical principles of the present invention, and these improvements and modifications should also be regarded as falling within the scope of the invention.

What is claimed is:

1. A compound preparation for treating Parkinson's disease, consisting of the following extracts by mass: 6-15 parts of an aqueous extract of *uncaria rhynchophylla*, 3-9 parts of an aqueous extract of *gastrodia elata*, 6-12 parts of an aqueous extract of *Gentiana macrophylla*, 10-20 parts of an aqueous extract of raw *Astragalus membranaceus*, 10-20 parts of an aqueous extract of prepared *rehmannia* roots, 10-20 parts of an aqueous extract of *achyranthes* roots, 10-20 parts of an aqueous extract of wolfberry fruits, 10-20 parts of an aqueous extract of *angelica sinensis*, 10-20 parts of an aqueous extract of fried *atractylodes macrocephala*, 6-15 parts of an aqueous extract of fried spina date seeds, 3-12 parts of an aqueous extract of walnut kernels, 3-9 parts of an aqueous extract of safflower, and 20-30 parts of an aqueous extract of *zaocys dhumnade*.

2. The compound preparation for treating Parkinson's disease according to claim 1, wherein,
   the compound preparation consists of the following components by mass: 12 parts of an aqueous extract of *uncaria rhynchophylla*, 6 parts of an aqueous extract of *gastrodia elata*, 6 parts of an aqueous extract of *Gentiana macrophylla*, 10 parts of an aqueous extract of raw *Astragalus membranaceus*, 15 parts of an aqueous extract of prepared *rehmannia* roots, 10 parts of an aqueous extract of *achyranthes* roots, 10 parts of an aqueous extract of wolfberry fruits, 10 parts of an aqueous extract of *angelica sinensis*, 10 parts of an aqueous extract of fried *atractylodes macrocephala*, 6 parts of an aqueous extract of fried spina date seeds, 3 parts of an aqueous extract of walnut kernels, 3 parts of an aqueous extract of safflower, and 20 parts of an aqueous extract of *zaocys dhumnade*.

3. The compound preparation for treating Parkinson's disease according to claim 1, wherein,
   the compound preparation consists of the following components by mass: 6 parts of an aqueous extract of *uncaria rhynchophylla*, 9 parts of an aqueous extract of *gastrodia elata*, 10 parts of an aqueous extract of *Gentiana macrophylla*, 15 parts of an aqueous extract of raw *Astragalus membranaceus*, 20 parts of an aqueous extract of prepared *rehmannia* roots, 20 parts of an aqueous extract of *achyranthes* roots, 15 parts of an aqueous extract of wolfberry fruits, 20 parts of an aqueous extract of *angelica sinensis*, 15 parts of an aqueous extract of fried *atractylodes macrocephala*, 15 parts of an aqueous extract of fried spina date seeds, 12 parts of an aqueous extract of walnut kernels, 9 parts of an aqueous extract of safflower, and 25 parts of an aqueous extract of *zaocys dhumnade*.

4. The compound preparation for treating Parkinson's disease according to claim 1, wherein,
   the compound preparation consists of the following components by mass: 15 parts of an aqueous extract of *uncaria rhynchophylla*, 3 parts of an aqueous extract of *gastrodia elata*, 12 parts of an aqueous extract of *Gentiana macrophylla*, 20 parts of an aqueous extract of raw *Astragalus membranaceus*, 10 parts of an aqueous extract of prepared *rehmannia* roots, 16 parts of an aqueous extract of *achyranthes* roots, 20 parts of an aqueous extract of wolfberry fruits, 15 parts of an aqueous extract of *angelica sinensis*, 20 parts of an aqueous extract of fried *atractylodes macrocephala*, 10 parts of an aqueous extract of fried spina date seeds, 10 parts of an aqueous extract of walnut kernels, 7 parts of an aqueous extract of safflower, and 30 parts of an aqueous extract of *zaocys dhumnade*.

5. A composition for treating Parkinson's disease comprising effective doses of the compound preparation according to claim 1 and pharmaceutically acceptable adjuvants.

6. The composition for treating Parkinson's disease according to claim 5, wherein,
   a dosage form of the compound preparation for treating Parkinson's disease is one of oral liquid, granules, instant soluble granules and tablets.

7. A composition for treating Parkinson's disease, comprising effective doses of the compound preparation according to claim 2 and pharmaceutically acceptable adjuvants.

8. A composition for treating Parkinson's disease, comprising effective doses of the compound preparation according to claim 3 and pharmaceutically acceptable adjuvants.

9. A composition for treating Parkinson's disease, comprising effective doses of the compound preparation according to claim 4 and pharmaceutically acceptable adjuvants.

10. The composition for treating Parkinson's disease according to claim 7, wherein,
    a dosage form of the composition for treating Parkinson's disease is one of oral liquid, granules, instant soluble granules and tablets.

11. The composition for treating Parkinson's disease according to claim 8, wherein,
    a dosage form of the composition n for treating Parkinson's disease is one of oral liquid, granules, instant soluble granules and tablets.

12. The composition for treating Parkinson's disease according to claim 8, wherein,
    a dosage form of the composition for treating Parkinson's disease is one of oral liquid, granules, instant soluble granules and tablets.

* * * * *